(12) United States Patent
Diezel et al.

(10) Patent No.: US 7,933,678 B2
(45) Date of Patent: Apr. 26, 2011

(54) SYSTEM AND METHOD FOR ANALYZING A PRODUCTION PROCESS

(75) Inventors: Matthias Diezel, Nürnberg (DE); Carsten Hamm, Erlangen (DE); Marc Holz, Erlangen (DE); David Koch, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 292 days.

(21) Appl. No.: 12/224,483

(22) PCT Filed: Oct. 20, 2006

(86) PCT No.: PCT/DE2006/001855
§ 371 (c)(1),
(2), (4) Date: Aug. 26, 2008

(87) PCT Pub. No.: WO2007/098724
PCT Pub. Date: Sep. 7, 2007

(65) Prior Publication Data
US 2009/0069905 A1    Mar. 12, 2009

(30) Foreign Application Priority Data
Feb. 28, 2006   (DE) .......................... 10 2006 009 263

(51) Int. Cl.
*G06F 19/00*    (2006.01)
*G05B 13/02*    (2006.01)
*G06F 11/30*    (2006.01)
*G21C 17/00*    (2006.01)
*G06G 7/48*     (2006.01)
*G06G 7/62*     (2006.01)

(52) U.S. Cl. ............ 700/173; 700/51; 700/52; 700/174; 702/182; 702/183; 703/6; 703/13

(58) Field of Classification Search ............... 700/51–52, 700/95–97, 104, 108, 173–174; 702/182–183; 703/3, 6, 13; 705/8, 10–11; 707/634, 636–637
See application file for complete search history.

(56) References Cited

U.S. PATENT DOCUMENTS
5,410,469 A * 4/1995 Sakamoto et al. ................. 700/9
(Continued)

FOREIGN PATENT DOCUMENTS
| DE | 199 28 980 A1 | 1/2000 |
| EP | 0 104 503 A2 | 4/1984 |
| GB | 2 118 328 A | 10/1983 |
| JP | 11 282520 A | 10/1999 |
| JP | 2001 209411 A | 8/2001 |

OTHER PUBLICATIONS

Deichmann K. et al; "Grafisches NC-Testsystem Zur Umfassenden Simulation"; Werkstatt Und Betrieb; München; Carl Hanser Verlag; 1; 0043-2792; Magazine; 1996; DE, pp. 26-29.

*Primary Examiner* — Ramesh B Patel

(57) ABSTRACT

The invention relates to a system and a method for analyzing a production process. In order to make it possible to analyze the production process in an improved manner for the purpose of production planning, the invention proposes a method for analyzing a production process in which at least one production device that is controlled by a control program is involved, wherein the method has the following method steps: at least one part of the control program is simulated using a simulation program and instructions which are executed in this case are logged, and an associated data record, in which the real-time requirement of an action caused by the logged instruction on the production device is respectively assigned to the logged instructions, is generated.

20 Claims, 4 Drawing Sheets

U.S. PATENT DOCUMENTS

| | | | |
|---|---|---|---|
| 5,454,086 A * | 9/1995 | Alpert et al. | 712/227 |
| 6,928,450 B2 * | 8/2005 | Mogi et al. | 1/1 |
| 7,684,887 B2 * | 3/2010 | Behrisch et al. | 700/110 |
| 2001/0034592 A1 * | 10/2001 | Herman | 703/13 |
| 2003/0093442 A1 * | 5/2003 | Mogi et al. | 707/203 |
| 2004/0220688 A1 * | 11/2004 | Behrisch et al. | 700/96 |
| 2004/0225552 A1 * | 11/2004 | Ikeda et al. | 705/9 |
| 2005/0043922 A1 * | 2/2005 | Weidl et al. | 702/183 |
| 2008/0215295 A1 * | 9/2008 | Shiraishi | 702/187 |

* cited by examiner

SYSTEM AND METHOD FOR ANALYZING A PRODUCTION PROCESS

CROSS REFERENCE TO RELATED APPLICATIONS

This application is the US National Stage of International Application No. PCT/DE2006/001855, filed Oct. 20, 2006 and claims the benefit thereof. The International Application claims the benefits of German application No. 10 2006 009 263.5 filed Feb. 28, 2006, both of the applications are incorporated by reference herein in their entirety.

FIELD OF INVENTION

The invention relates to a system and a method for analyzing a production process involving at least one production device.

BACKGROUND OF THE INVENTION

Such a system or method is used, for example, for developing new programs for numerically controlled machine tools. Modern machine tools have a numerical control which allows a production process to be defined in software in the form of an NC program. Within such an NC program, a user can define operations which a machine tool is to carry out for machining a workpiece in the form of individual instructions. For example, such an NC program can specify the time in which or speed with which a tool is to be moved to a particular starting position at the beginning of a production process. In the case of a numerically controlled milling machine, the NC program defines a cutting path which the tool is to follow to machine the workpiece at a rate of feed likewise defined in the program.

NC-controlled machine tools offer the user a high degree of flexibility in respect of the end products to be produced. If a new product is to be produced on a machine tool, a new NC program must be created or an existing one modified for this purpose. It is desirable that this NC program be analyzed, evaluated and optimized before it is used for volume production.

New NC programs or sub-routines are generally developed in advance using a suitable programming system, independently of the target system. Before the program is used for mass production, it is often tested on a simulation system, an abstract control model generally being used for the actual target system. Finally the program can also be tested in real time on the actual target system itself, i.e. on the actual control or actual machine. Although real-time testing on the actual target system provides more accurate and informative results than simulation on a simulation system because of the abstract and simplified models used in the simulation, it is much more time-consuming.

Tools known as profilers are often used to analyze and optimize the runtime behavior of software programs. Profilers help a developer to detect and eliminate problem areas by analyzing and comparing running programs. The purpose of profiler tools is generally to maximize the efficiency and therefore the speed of execution of a software program on a computing unit.

DE 199 28 980 A1 discloses a method, a system and a device for generating and optimizing native code in a runtime compiler from a group of bytecodes. Using a "profiling" process performed during one or more program runs, knowledge of a set of classes used in a program is collected and can be used for optimizing the program for a specific runtime environment.

In today's production plants, because optimum machine capacity utilization is required, it is usual for production processes to be executed in parallel on a plurality of production devices, with all the machining resources having to be synchronized. The planning and subsequent coordination of these sequences are highly complex. The actual coordination of multiple machine attendance is therefore often performed in practice by a machine operator himself. When a plurality of production devices are used as part of a production process, prior production planning is difficult or only possible on the basis of empirical values or estimates. The more precise the planning of multiple machine operation, the higher the planning complexity required for maximizing machine capacity utilization.

Various methods have hitherto been used for planning multiple machine attendance in a production process. In the simplest case, production planning is based on a rough estimate using empirical values. These empirical values cover all the relevant operations such as automatic sequences (turning, milling), manual interventions (rechucking of workpieces) or restrictions of operation due to operational requirements such as working hours, rest breaks or meal breaks, the precise multiple machine attendance strategy generally being defined by the machine operator himself.

In a somewhat more precise but also much more complex procedure, all the operations in a production line are listed and provided with the relevant estimated or calculated time requirement, all the operations resulting from a specific multiple machine attendance having to be recorded beforehand.

SUMMARY OF INVENTION

The object of the invention is to allow improved analysis of a production process for production planning.

This object is achieved by a method for analyzing a production process involving at least one production device controlled by a control program, said method comprising the following steps:
  simulating at least a section of the control program using a simulation program and logging instructions executed during said simulation, and
  generating an associated data record in which the logged instructions are in each case assigned the real-time requirement of an action effected by the logged instruction on the production device.

The object is also achieved by a system for analyzing a production process involving at least one production device controlled by a control program, said system having
  a first memory area for the control program,
  a second memory area for a simulation program and
  an execution unit for simulating at least one section of the control program using the simulation program, for logging instructions executed during same and for generating an associated data record in which the logged instructions are in each case assigned the real-time requirement of an action effected by the logged instruction on the production device.

The object is further achieved by a computer program product designed to carry out the abovementioned method when run on a computer.

With the method according to the invention at least one control program is analyzed by means of a simulation program. The control program is designed to control a production device involved in the production process. A plurality of production devices can of course also be involved in the production process, in which case the method can be applied to the correspondingly larger number of control programs in the same way.

According to the invention, at least one section of the control program is simulated using the simulation program. The control program instructions executed in the course of this are logged. A data record associated with the control program is generated in which the logged instructions are each assigned the real-time requirement of an action produced by the logged instruction on the production device. In this way there can be generated, for the entire control program, a tabular listing in which each instruction of the control program is assigned the associated real-time requirement.

The granularity with which the instructions are logged for this listing is basically freely selectable. The real-time requirement for each individual instruction[s] can thus be discretely determined and logged, said instruction possibly being e.g. a straight addition to be carried out on the target system. Alternatively, however, a function call can also be understood as an instruction in this sense, said function call being logged and the time required for processing the complete function on the production device being determined and stored in the associated data record.

If a plurality of production devices are involved in the production process, it is possible to deal with their control programs in a completely analogous manner. In this way, after application of the method, a plurality of data records are obtained which document the real-time requirement of the associated control programs on the corresponding production devices for the individual instructions required for carrying out the production process. The data records therefore provide a virtually ideal basis for optimizing the production process. Using these data records, the control programs can be optimized such that optimum machine capacity utilization can be achieved for the production devices, thereby enabling the efficiency of the entire production process to be maximized.

In an advantageous embodiment of the invention, to simulate the at least one program section and generate the data record, a machine model characterizing the production device and its configuration data are accessed, the machine model and the configuration data being stored on a data processing device connected to the production device via a data link. The data processing device is connected to the production device(s) involved in the production process e.g. via a corporate intranet or even the Internet and is therefore also able to access its/their current configuration and use the configuration data for the subsequent simulation. With the aid of the configuration data, the machine model(s) stored on the data processing device can be configured such that they reproduce the associated actual production device as well as possible. A simulation environment such as VNCK (Virtual NC Kernel) can finally be used to determine the real-time requirement of the individual instructions of the control program and create the corresponding data record using the fully configured machine model. If a plurality of production devices are involved in the production process, correspondingly more machine models and configuration data records are stored on the data processing device. For each production device an associated data record is generated.

For maximally precise analysis of the production process and therefore maximally efficient production planning based thereon, not only the productive times of the machines involved must be known, but also the times during which the corresponding machines are in a non-productive state. Such non-productive times may be personnel-related. Examples include rest breaks, the lunch period as well as the limits of the working hours. Another embodiment is therefore advantageous in which the non-productive times actually arising during execution of the program section on the production device are determined on the basis of a time table stored on the data processing device and/or of a behavior model stored on the data processing device and are logged in the data record. For visualization of a plurality of data records of a plurality of production devices, both the productive times and the non-productive times can be indicated in a joint display.

In another advantageous embodiment of the invention, the method is carried out using a client computer which is connected to the data processing device via an intranet or the Internet, the data processing device here acting as a server to which in particular a plurality of client computers are connected as workstations. The simulation program can be stored on the data processing device and initiated via the client computer. Alternatively, the simulation program can also be installed on each client, the machine model, the time table and/or the behavior model being loaded from the data processing device to the client computer.

Here in particular another embodiment of the invention is advantageous in which the time table and/or the behavior model are modified from the client computer. For example, in the event of a change in the working hours on which the production process is based, a user can modify the time table stored on the data processing device accordingly from the client computer. Likewise, a new behavior model can also be loaded onto the data processing device from the client computer.

In another advantageous embodiment of the invention, the real-time requirement of the actions produced by the logged instructions are added together within the associated data record to produce a machining time required for execution of the program section on the corresponding production device. This is advisable in order to automatically determine the total time requirement of the simulated program section. If, as will generally be the case, the program section is the entire control program, the machining time corresponds to the time which the real target system requires for executing the corresponding control program for the actual production process. In particular, this enables not only the times in which the machine is productive but also its non-productive times due e.g. to tool changes or the like to be taken into account. Different information may be useful for optimizing the control programs. Thus, for example, an NC programmer will benefit from an advantageous embodiment of the invention in which the number of executions of the instructions during the simulation of the program section is logged.

Application of the inventive method is useful and advantageous particularly within an embodiment of the invention in which the control program is an NC program for production devices implemented as numerically controlled NC machines.

In an advantageous embodiment of the invention, the method is carried out for at least one other production device involved in the production process and controlled by another control program. The abovementioned steps are performed in a completely analogously manner for the two production devices or their control programs, resulting in a data record for each production device or control program. The data records can be compared with one another in order to optimize the overall process.

Helpful particularly for manually performed deriving of optimization criteria is an embodiment of the invention is in which the data records of the two control programs are graphically visualized in a common display. A planner can thus very quickly identify where a requirement exists for optimizing the multiple machine production process. Due to the fact that he can simultaneously take in the in particular graphical representation of the two data records for the two control processes, the productive and non-productive times of the production devices involved which are caused by the respective control programs can be better coordinated.

In another advantageous embodiment of the invention, the data records of the two control programs are compared with one another to derive optimization criteria for the production process. Said optimization criteria can be automatically generated by in particular computer-aided analysis of the two data records.

BRIEF DESCRIPTION OF THE DRAWINGS

The invention will now be explained and described in greater detail with reference to the exemplary embodiments illustrated in the accompanying drawings in which.

DETAILED DESCRIPTION OF INVENTION

Figure 1:
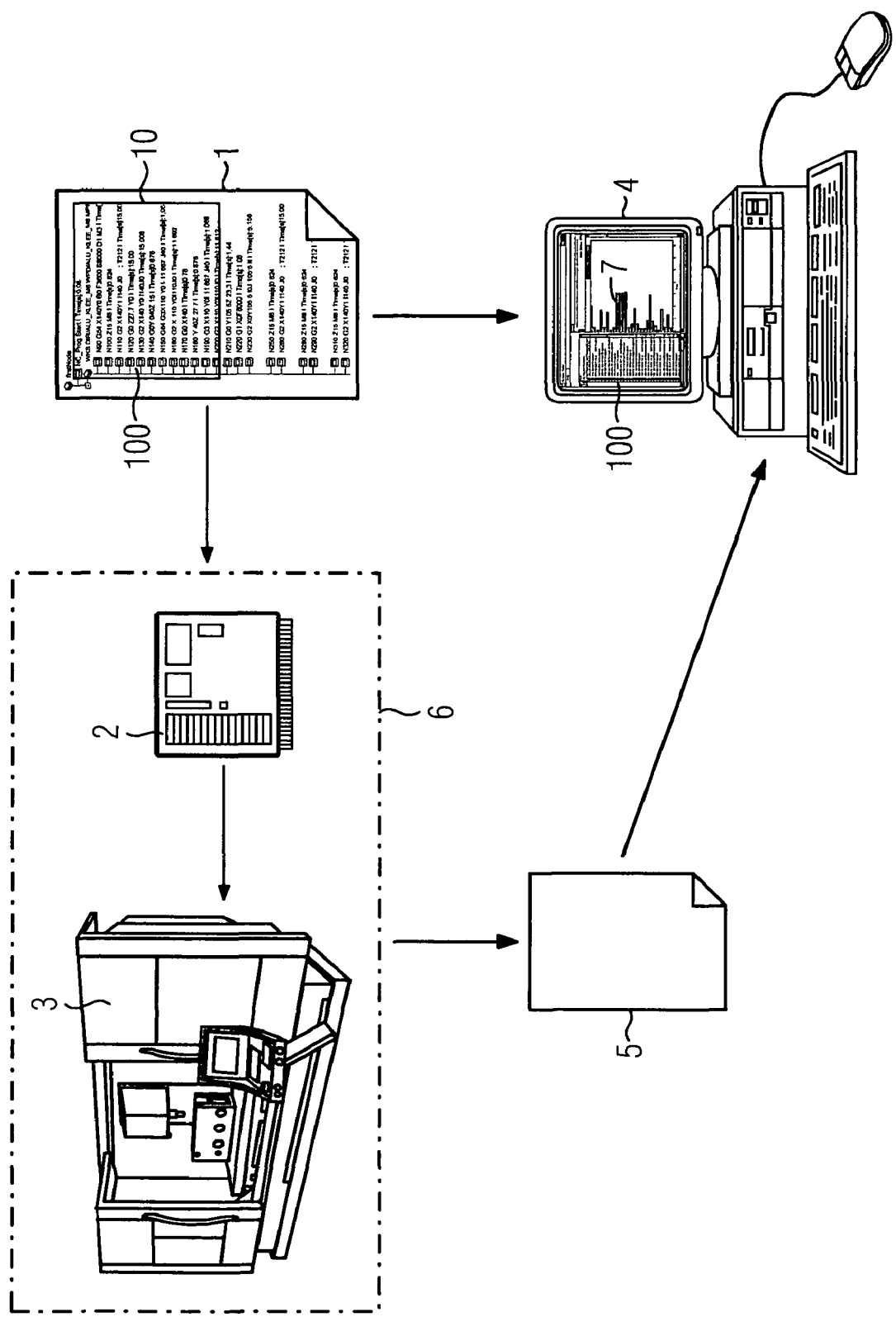
FIG. 1 shows an application of a system for analyzing a production process whereby a data record is generated for a control program.

FIG. 1 shows an application of a system for analyzing a production process whereby a data record is generated for a control program 1 stored on a numerical control 2 in order to control a production device 3. The production device 3 is a numerically controlled machine tool. Analysis of an individual control program will be described here purely by way of example in order to explain an embodiment of the inventive method. To optimize the entire production process, the steps described below are also carried out for all the other machine tools involved in the production process in order to be able to synchronize their productive and non-productive times in an ideal manner in terms of maximum total capacity utilization.

The machine tool 3 is linked to a data processing device 4 via an intranet. Via this data link the first control program 1 is loaded into a first memory area of the data processing device 4. Also installed on the data processing device 4 in a second memory area is a simulation program designed to simulate the control program 1 taking real-time conditions into account. The simulation software stored on the data processing device 4 allows control programs to be simulated in a form in which they can also be executed on the numerical control 2. A configuration data record 5 is also loaded from the machine tool 3 onto the data processing device 4. Said configuration data record 5 can be used to configure a machine model stored on the data processing device 4 in such a way that the behavior of the machine tool 3 can be replicated as accurately as possible by the simulation. For example, the configuration data record 5 could contain a sampling rate of the numerical control 2 which defines the minimum time base with which instructions of the control program 1 can be executed on the numerical control 2. Such a sampling rate ultimately affects the real-time behavior of the machine tool 3, as it defines the time requirement of control program instructions to be numerically processed.

The control program 1 consists of a plurality of program sections 10 which can be e.g. sub-routines. Said program sections 10 are in turn made up of individual instructions 100. These instructions can be simple operations that cannot be scaled further or function calls which in turn give rise to a number of further instructions or operations.

To analyze the runtime behavior of the control program 1, it is simulated on the data processing device 4 to determine the real-time requirement for the control program 1 or at least of individual program sections 10 of the control program 1. During simulation of the control program 1 there is determined, for each individual instruction 100, a machining time interval which specifies the amount of real time which would be required on the target system 6 by an operation executed on the machine tool 3 by means of the corresponding instruction 100. The machining time intervals are logged together with the associated instructions 100. The machine model of the target system 6 and its configuration data record 5 stored on the data processing device 4 are used as the information source for assigning the machining time intervals to the individual instructions 100.

The results of such a runtime analysis of the control program 1 are then displayed via an output mask of the simulation program, the individual instructions 100 being represented, for example, by horizontal bars 7 which graphically illustrate the real-time requirement of the instructions 100.

By way of example, the individual steps for analyzing the production process are shown in FIG. 1 for one production device 3 only. However, the method can also be used, as not shown here, for at least one other machine tool associated with the production device. A corresponding other control program is analyzed as described above. The result of this analysis is a corresponding other data record which can likewise be graphically represented in the form of a bar chart as shown in FIG. 1. To optimize the production process as a whole, it is advantageous for the data records to be jointly displayed on the screen of the data processing device 4 so that a system user can easily identify the places where the production process can be optimized by modifying the individual control programs of the machine tools involved.

Figure 2:
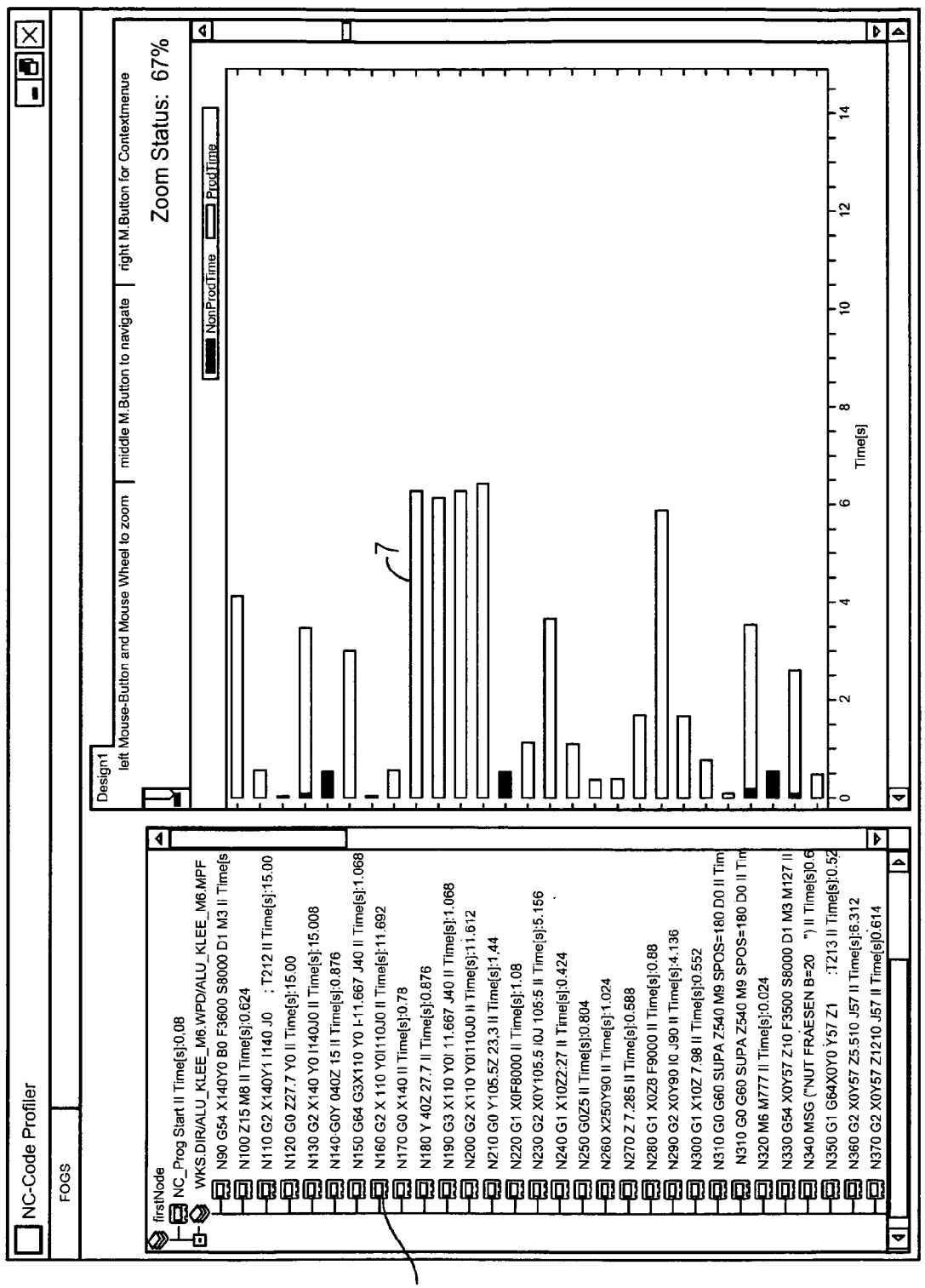
FIG. 2 shows a graphical representation, as produced by the system, of the data record associated with the control program.

FIG. 2 shows a graphical representation, produced using the system, of the data record associated with the control program 1. The screen display shown is the result of the runtime analysis of the control program described with reference to FIG. 1. The user interface illustrated is subdivided into a left- and a right-hand pane. The left-hand pane lists instructions 100 of the control program arranged in a hierarchical tree structure. As in FIG. 1, only one instruction is provided with a reference character by way of example. For example, the highest hierarchical level contains the complete control program 1, the next lower level individual program sections 10 such as sub-routines and finally the lowest hierarchical level the individual instructions 100 which are part of the program sections 10. The right-hand screen pane show horizontal bars 7 which are plotted along a time axis. Each bar 7 represents the real-time requirement of an associated instruction 100 of the control program 1, the empty regions of the bars 7 representing the productive time of the target system 6 brought about by an instruction 100 on the target system 6. On the other hand, the filled-in regions of the bars 7 represent the non-productive times of the machine tool 3. These describe the time intervals in which the machine tool 3 is not productive. In this way a developer of the control program 1 can very quickly identify the optimization requirement of his program. This is particularly the case when one or more additional data records of other control programs are visualized simultaneously, the other control programs being designed to control other production devices involved in the production process.

Figure 3:
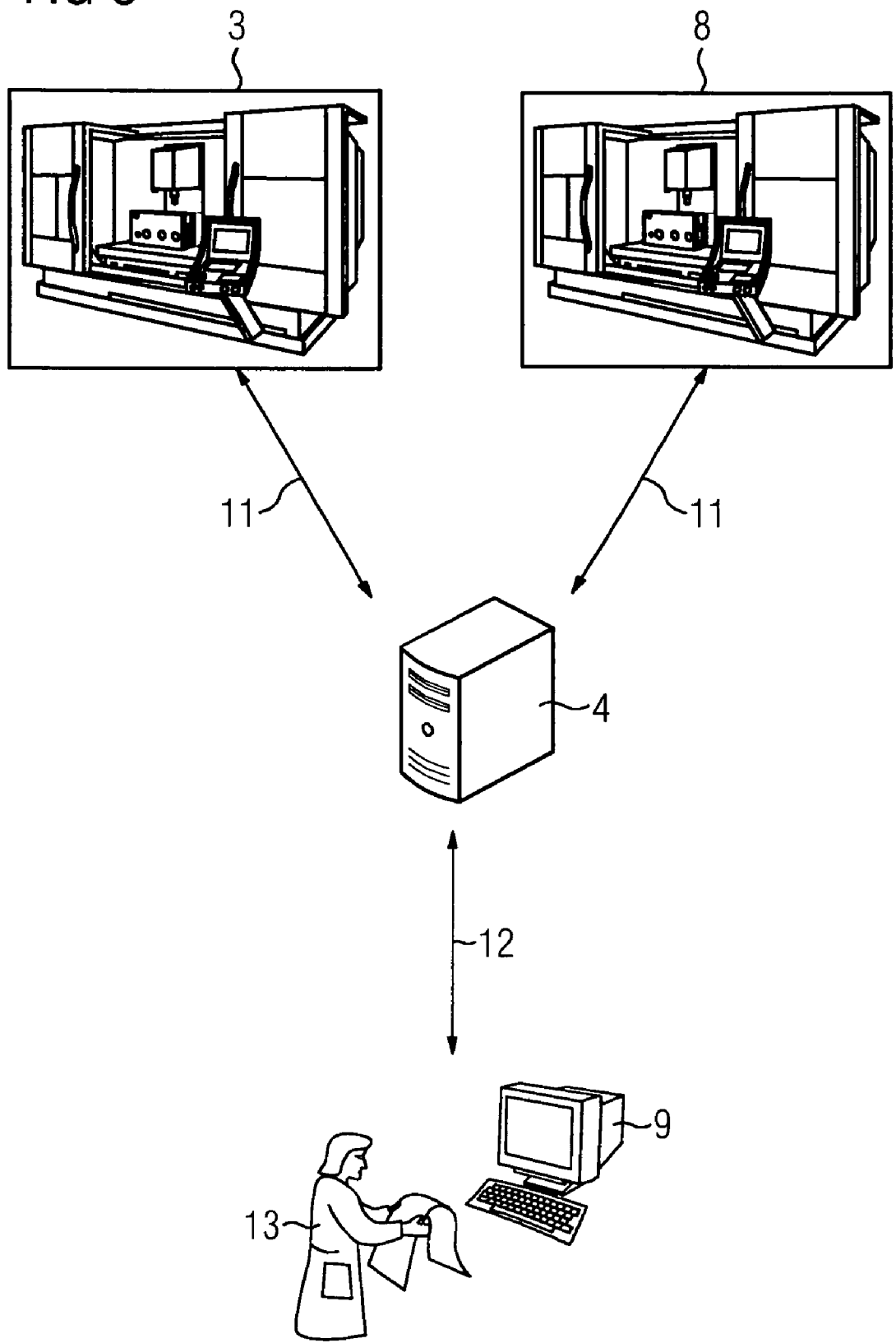
FIG. 3 shows a system implemented as a client/server architecture for analyzing a production process involving two production devices, and FIG. 4 schematically illustrates a method for analyzing a production process involving two production devices.

FIG. 3 shows a system, implemented as a client-server architecture, for analyzing a production process involving a production device 3 and another production device 8 operating in parallel. The two production devices 3, 8 are each connected via an intranet link 11 to a data processing device 4. The data processing device 4 assumes the role of a web server and has a data link to a client computer 9 via an Internet connection 12.

Installed on the data processing device 4 is a simulation program such as VNCK with which the real-time behavior of actual production plants can be simulated. Machine models for the production devices 3, 8 are additionally stored in a memory of the data processing device 4.

The following is a conceivable scenario for using the system shown. A user 13 is tasked with optimizing the multiple machine production process in order to maximize machine capacity utilization for both the production device 3 and the other production device 8, thereby ensuring maximum production process efficiency. For this purpose, an analysis tool is installed on the client computer 9. The analysis tool enables data records of the two production devices 3, 8 resulting from analysis of their runtime behavior or rather the runtime behavior of their control programs to be graphically represented. The data records are generated using the simulation program installed on the data processing device 4.

To simulate the production process, the respective machine configuration is first loaded from both the production device 3 and the other production device 8 via the intranet link 11. On the basis of the loaded machine configurations, the associated machine models can be configured accordingly in order to enable the actual plants to be modeled as realistically is possible. The control programs for controlling the production devices 3, 8 are also loaded onto the data processing device 4 via the intranet link 11. On the basis of the control programs, machine models and machine configuration data records, a data record containing information about the real-time behavior of the numerically controlled production process is generated for each of the two production devices 3, 8 by simulation. Said data records can contain the productive times of the corresponding production devices 3, 8 and also, if corresponding basic information is stored on the data processing device 4, the non-productive times occurring during the process. The graphical representation of the data records on the client computer 9 enables the user 13 to identify optimization potential in the multiple machine production process and if necessary modify the control programs of the two production devices 3, 8 accordingly, thereby increasing the machine utilization factors.

Figure 4:
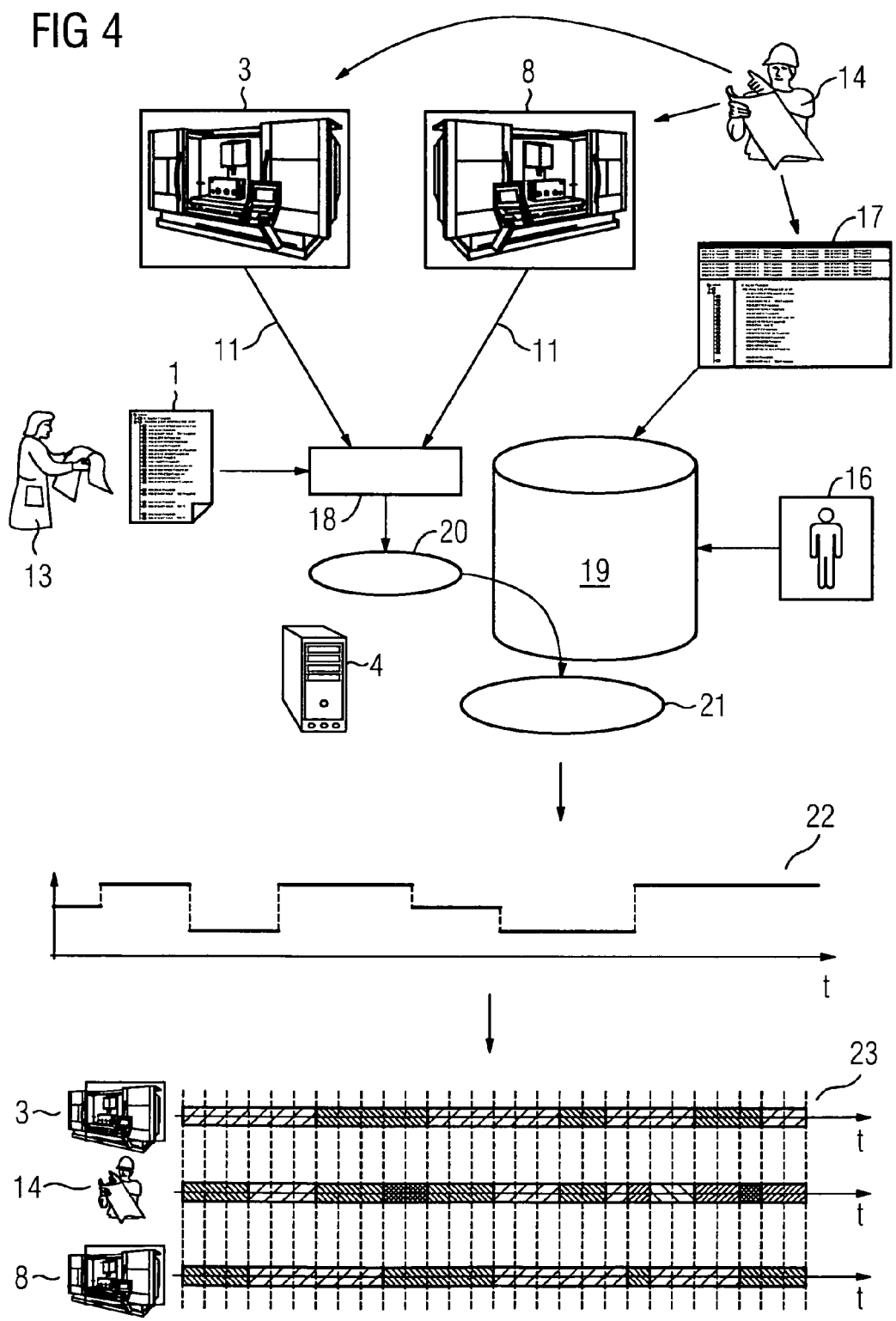

FIG. 4 schematically illustrates a method for analyzing a production process involving a production device 3 and another production device 8. The two production devices 3, 8 are attended by a machine operator 14 if the production process requires manual control operations. As only one operator 14 is available for the two production devices 3, 8, it is advisable when designing the multiple machine process to ensure that the necessary manual control operations for the two production devices 3, 8 do not arise simultaneously. However, clashes of this kind are relatively difficult to predict in advance particularly in the case of complex production processes. In the analysis method shown, a simulation program 18 installed on the data processing device 4 is therefore used in order to predict clashes of this kind.

The data processing device 4 is connected via an intranet link 11 to both the production device 3 and the other production device 8. Additionally stored in a memory 19 of the data processing device 4 are a machine model for each of the two production device 3, 8 as well as behavior modules and time tables which reproduce the typical behavior of the machine operator 14. Corresponding time tables and/or behavior models are modifiable by the machine operator 14 via a Web portal 17 of the data processing device 4 and can therefore be adapted to changed operating conditions. The behavior modules stored in the memory 19 or the specified operator control rules can also be the result of an ergonomic simulation 16. These ergonomic simulation results 16 are likewise stored in the memory 19 of the data processing device 4.

To plan the production process, the user 13 creates a control program 1 for both the production device 3 and the other production device 8. The two control programs 1, only one of which is shown here by way of example, are loaded into the data processing device 4 where they are simulated on the basis of the information stored in the memory 19 and using the simulation program 18. The simulation takes into account not only the corresponding machine models of the production devices 3, 8 but also the configuration data which is loaded into the data processing device 4 if necessary via the intranet link 11.

The simulation results 20 initially only receive a chronological distribution of the times during which the production devices 3, 8 are productive. Said simulation results 20 are finally augmented by the non-productive times arising during the production process on the basis of the behavior models or time tables stored in the memory 19, finally resulting in, for each of the two production devices 3, 8, a data record 21 documenting a chronological distribution of the productive and non-productive times during the production process for the associated production device 3, 8.

For each of the two production devices 3, 8 the associated data records 21 can initially also be represented separately in the form of a first screen display 22, with manually caused non-productive times having the lowest ordinate value. Non-productive times caused by automatic operation have the intermediate ordinate value and the productive times of the corresponding production device 3, 8 are given the highest ordinate value in the display.

As these results are available for the two production devices 3, 8, an analysis tool can now be used to generate a second screen display 23 on the basis of which multiple machine operation can be thoroughly analyzed and finally optimized taking user interventions into account. For the production devices 3, 8, the coarsely hatched bars indicate when said devices are in automatic mode. For the machine operator 14, the coarsely hatched bar indicates when said operator has a break. This is consistently the case only when the two production devices 3, 8 are in automatic mode. On the other hand, the closely hatched bars indicate when manual operator control is necessary for the respective production device 3, 8. Consequently, for the machine operator 14, a closely hatched bar is always shown when one of the two production devices 3, 8 is in a "manual operator control" operating state.

If the production device 3 and the other production device 8 both have the operating state "manual operator control", this results in a clash represented in the timing chart of the machine operator 14 as a cross-hatched bar. Such an operator control clash results in a delay to the production process and must therefore be eliminated in a subsequent optimization step.

On the basis of the second screen display 23 shown, which was created using an analysis tool, the subsequent optimization step can be performed manually by the operator 13.

Alternatively, however, it is also conceivable for automatic determination of optimization criteria to take place on the basis of the data records 21 on which the second screen display 23 is based, said criteria resulting in modification of the control programs of the production devices 3, 8 and thereby increasing machine capacity utilization.

The invention claimed is:

1. A method for analyzing a production process involving a production device controlled by a control program, comprising:
   simulating a program section of the control program using a simulation program and logging instructions executed during the simulation; and
   generating an associated data record wherein the logged instructions are each assigned a real-time requirement of an action effected on the production device by the logged instruction.

2. The method as claimed in claim 1, further comprising:
   storing a machine model and configuration data characterizing the production device in a memory of a data processing device connected to the production device via a data link; and
   accessing the machine model including the configuration data in order to simulate the program section and to generate the data record.

3. The method as claimed in claim 2, further comprising:
   determining non-productive time arising during execution of the program section on the production device based upon a time table stored in the memory of the data processing device and/or a behavior model stored in the memory of the data processing device; and
   logging the determined non-productive time in the data record.

4. The method as claimed in claim 3,
   wherein the method is carried out using a client computer connected to the data processing device via an intranet or the Internet.

5. The method as claimed in claim 4,
   wherein the time table and/or the behavior model are modified from the client computer.

6. The method as claimed in claim 5,
   wherein the real-time requirement of the actions effected by the logged instructions are added together within the associated data record to produce a machining time required for execution of the program section on the production device.

7. The method as claimed in claim 6,
   wherein the number of executions of the instructions during simulation of the program section is logged.

8. The method as claimed in claim 7,
   wherein the control program is an NC program for production devices implemented as numerically controlled NC machines.

9. The method as claimed in claim 8,
   wherein the method is carried out for at least one other production device involved in the production process and controlled by another control program.

10. The method as claimed in claim 9,
    wherein the data records of the two control programs are in particular graphically visualized in a common display.

11. The method as claimed in claim 10,
    wherein the data records of the two control programs are compared with one another to derive optimization criteria for the production process.

12. A system for analyzing a production process involving a production device controlled by a control program, comprising:
    a first memory area that contains the control program;
    a second memory area that contains a simulation program; and
    an execution unit that
       simulates a program section of the control program using the simulation program,
       logs instructions executed during the simulation and
       generates an associated data record in which the logged instructions are each assigned the real-time requirement of an action effected by the logged instruction on the production device.

13. The system as claimed in claim 12, further comprising:
    a data processing device connected to the production device via a data link, the data processing device including a third memory area in which a machine model and configuration data characterizing the production device are stored.

14. The system as claimed in claim 13,
    wherein the data processing device comprises:
       a fourth memory area in which a time table and/or a behavior model is stored,
       a determining device that determines, based on the time table and/or behavior model, the non-productive times arising during execution of the respective program section on the production device and
       a logging device that logs the non-productive times in the associated data record.

15. The system as claimed in claim 14,
    wherein the data processing device is connected to a client computer via an intranet or the Internet.

16. The system as claimed in claim 15,
    wherein the time table and/or the behavior model are modifiable from the client computer.

17. The system as claimed in claim 16, further comprising a combining device that adds together, within the data record, the real-time requirement of the actions effected by the logged instructions to produce a machining time required for execution of the program section on the production device.

18. The system as claimed in claim 17, further comprising a further logging device that logs the number of executions of the instructions during simulation of the program section.

19. The system as claimed in claim 18,
    wherein the control program is an NC program for production devices implemented as numerically controlled NC machines.

20. The system as claimed in claim 19, further comprising an analysis tool that derives optimization criteria for the production process by comparing data records of a plurality of production devices.

* * * * *